United States Patent Office 2,824,299
Patented Feb. 18, 1958

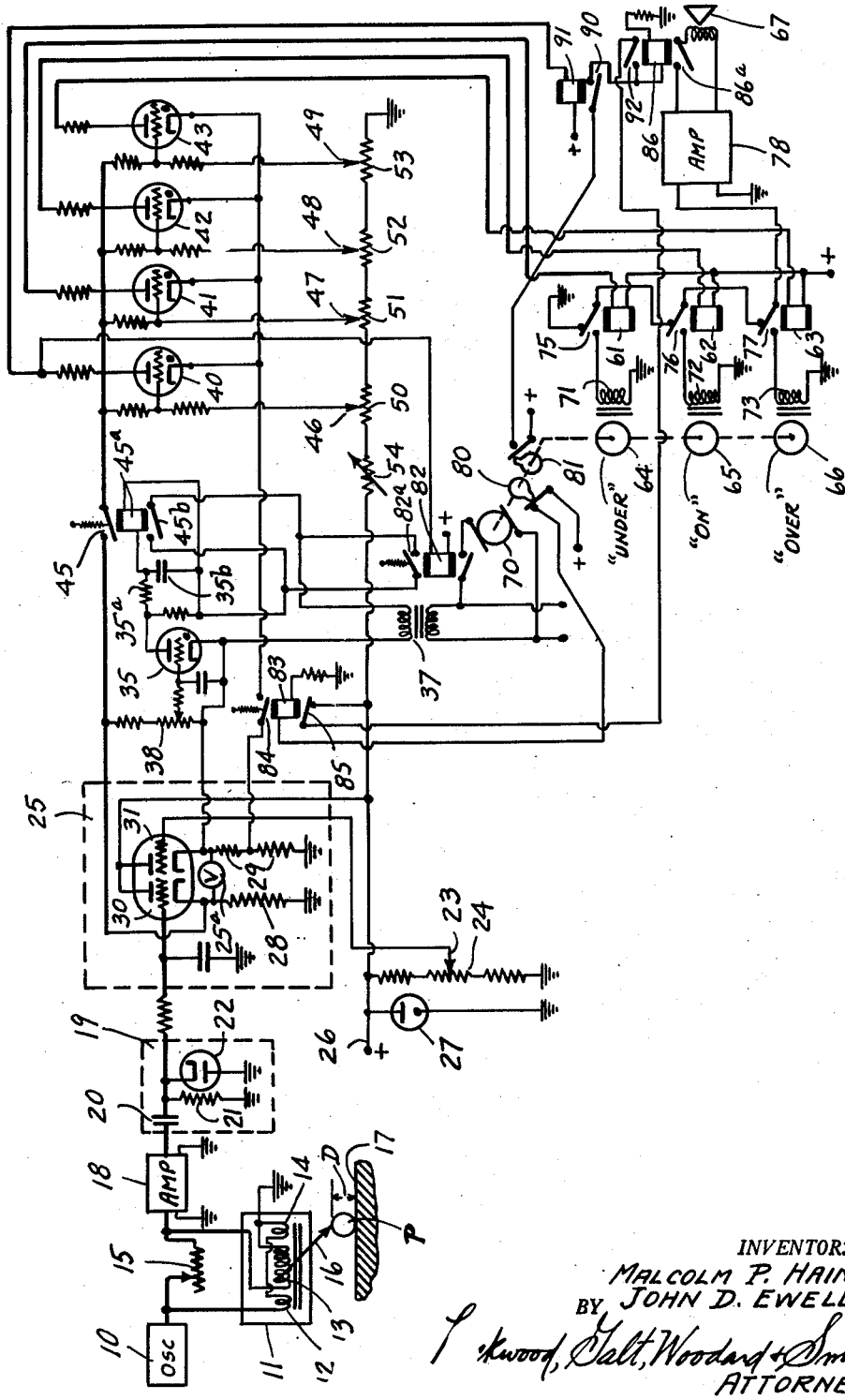

2,824,299

MEASURING GAUGES

Malcolm P. Haines and John D. Ewell, Indianapolis, Ind., assignors to Merz Engineering, Inc., Indianapolis, Ind., a corporation Application January 26, 1956, Serial No. 561,472

13 Claims. (Cl. 340—265)

This invention relates to gauges for measuring minute dimensions, and is particularly directed to means for measuring dimensions of machined or other parts, and for grouping the parts according to size.

Heretofore, surface gauges have been made comprising a stylus movable with respect to a plane or reference table and with various electrical and mechanical means for amplifying the motion of the stylus for application to an indicating dial. Such gauges yield quantitative measures of dimensions with accuracies, commonly to four or five significant decimal places. Such measuring gauges usually mean nothing to unskilled operators and often absolute measurements are not necessary nor desired. It is often desirable, however, in machine work to group machine elements such as roller or ball bearings, according to size, absolute dimensions being unnecessary. Such repetitive measuring should be accurately conducted by unskilled or blind operators.

An object of this invention is an improved measuring gauge.

A more specific object of this invention is an improved measuring gauge which will produce an audible or visible signal to indicate the size of the part being measured.

A still more specific object of this invention is a measuring gauge for producing a plurality of indicating signals for informing the operator the size group into which the parts being measured should be placed.

Still another object of this invention is a measuring gauge for selectively producing a plurality of audible signals indicative of the size of the part being measured.

The objects of this invention are attained by a movable stylus coupled to an oscillator circuit, the output of which may be modulated by the movement of the stylus so that the oscillator output becomes a function of displacement of the stylus. This modulated voltage is rectified and is then compared in amplitude with a reference voltage to produce a third voltage, the amplitude of which is proportional to the deviation of the size of the part being measured from a reference standard size. The grids of a plurality of grid-controlled gaseous discharge tubes are connected in parallel to the output of the comparator circuit, and the outputs of the tubes are connected, respectively, with relay controlled circuits between a plurality of record pick-ups and a loudspeaker.

The records may contain audible messages such as "on" or "under" or "over" to indicate to the operator that the part being measured is "on" a reference dimension or is "over" or is "under," to facilitate grouping of parts according to size. Tolerances, or breadth of size groups, may be adjusted according to this invention. A bank of lights, with appropriate markings could be substituted for the phonograph recordings.

Other objects and features of this invention will become apparent to those skilled in the art by referring to the specific embodiment of the invention described in the following specification, defined in the attached claims, and shown in the accompanying drawing, in which the single figure is a wiring diagram of said one embodiment.

In the drawing the part "P" is laid upon the reference plane table 17 and the stylus 16 is brought into contact with the part, the dimension "D" of which is to be measured. The stylus 16 is mechanically connected to a slug of magnetic material of high permeability in one of the coils 12, 13 and 14 mounted on a magnetic core in such a manner that minute movements of the slug will produce relatively large variations of inductance of the series-connected coils. Coil 14, for example, may be normally equal to the inductance of coils 12 and 13 so that when the three coils rest in balanced bucking relation, the apparent inductance is infinite or at a high maximum. The impedance of the series coils drops sharply when the slug is moved.

In the preferred embodiment of this invention, the modulator 11 is connected between the output of oscillator 10 and the input of amplifier 18. For adjustment of the normal signal applied to the amplifier, a variable resistance 15 is shunted across the modulator 11. Preferably, the modulator 11 with its stylus 16 is physically mounted upon a carriage with screw adjustments for carrying the modulator vertically in ways to position the stylus 16 any arbitrary distance "D" above plane table 17. In this particular embodiment, the distance "D" is assumed to be the minimum dimension that will be encountered in measuring parts "P" and that the variation in impedance of modulator 11 will be in one direction, or of the same sign for all variations of dimension "D." Whether the null voltage corresponds to maximum, minimum, or a center dimension, the amplitude of the output voltage of amplifier 18 will be analogous to dimension "D" and will vary various amounts for each part "P" pushed under the stylus.

Inasmuch as the voltage generated at 10 and modulated at 11 is easily amplified, compared to the amplification of direct current, the analogy of dimension "D" to voltage is easily preserved, even with large gains in the dimension signal in the amplifier.

The alternating output of amplifier 18 is rectified in rectifier 19. The rectifier shown comprises coupling condenser 20, coupling resistor 21, and diode 22. The direct current voltage across the diode is proportional to the alternating voltage across the output of amplifier 18.

The direct current output of rectifier 19 is compared with a reference voltage applied to terminal 26. This reference voltage is preferably positive in polarity and is held at a steady level by the voltage regulator glow discharge tube 27 connected between the terminal and ground. Any desired proportion of the reference voltage may be selected by the adjustable contact 23 on voltage divider 24.

According to one feature of this invention, the modulated direct current of the gauge and the reference potential is compared in the comparator 25. The particular comparator shown comprises a four-sided bridge circuit with resistors 28 and 29 of equal value in adjacent branches of the bridge. The other two branches of the bridge comprise the anode-cathode impedances of triodes 30 and 31. The known and unknown voltages from potentiometer 24 and rectifier 19 are applied, respectively, to the grids of the triodes 31 and 30. With the two anodes connected together as shown and with the two grids at equal potentials, the bridge is balanced and the potential across the diagonal, at the two cathodes, is zero. Hence, the diagonal voltage is a function of stylus displacement without the disadvantage of any direct coupling between the known and unknown voltage circuits. The zero-center voltmeter 25a may be connected across the bridge diagonal for convenience in calibrating and balancing the bridge for no-signal conditions.

The continuously variable voltage across said diagonal of the bridge is divided into a plurality of groups of voltages, according to this invention. The grid-controlled gaseous discharge tubes 40, 41, 42 and 43 are coupled across the comparator bridge diagnoal. The grids of each gas tube are connected in parallel and through the normally closed contacts 45 to one point of the comparator bridge, while the cathodes of the gas tubes are connected in parallel and through the normally closed contacts 84 to the other point of the bridge diagonal. It is found desirable to bias the gas tube cathode potentials by connecting the cathodes to an intermediate point on the bridge resistance 29, as shown, so that the gas tubes 40–43 may fire at a predetermined grid voltage even though the reference voltage at point 23 and current through the comparator tubes 30, 31 may be varied.

According to another and important feature of this invention, the grids of the gas tubes are progressively biased to different values. The grids of tubes 40, 41, 42, and 43 are connected, respectively, through grid resistors to adjustable contacts 46, 47, 48 and 49 on voltage dividers 50, 51, 52 and 53 connected in series between the reference voltage sources 26 and ground. The static bias of different values on the grids are added to the voltage across the diagonal of the comparator bridge so that the tubes 40, 41, 42, and 43 will fire successively at different voltages as the voltage across the diagonal increases.

The anode circuits of gas tubes 41, 42, and 43 are completed through indicator circuits comprising, in the embodiment shown, relay windings 61, 62, and 63. These relays move armatures 75, 76, and 77, respectively, between front and back contacts for selectively connecting magnetic pick-up devices 71, 72, and 73 to loud speaker 67. The pick-ups are operatively associated, respectively, with phonograph-type recordings on transcriptions 64, 65, and 66, driven on a common shaft by motor 70. The transcriptions may be on discs or magnetized tapes or wires.

In operation, the particular record and pick-up operatively connected to the loud speaker preferably through the amplifier 78, depends upon the highest signal voltage applied to the grids of gas tubes 41, 42, and 43, and upon the last tube in the series to be fired by the signal. If, for example, tubes 41 and 42 are fired and tube 43 is not fired, pick-up 72 only is coupled into the loud speaker circuit. In this example, the circuit of pick-up 71 is interrupted by an open circuit at the back contact of armature 76 on relay 62. It is important, of course, that only one recording be reproduced at the loud speaker.

By way of example, the records 64, 65, and 66 may contain, respectively, the words "undersize," "onsize," and "oversize." Alternatively, the records could contain words indicating actual size, such as "one-half thousandths oversize" etcetera. As many recordings and relays to select the recordings as size groups desired may be employed.

Since the piece "P" to be measured is of unknown size and the stylus 16 may be moved through a number of size groups before the stylus comes to rest at distance "D" from the plane table, it is important that the circuitry of this gauge not be energized to produce a false signal. It is important that the message on the appropriate phonograph record be reproduced for a certain minimum time for the benefit of the operator before the circuitry is released for the next succeeding measurement. A reliable time delay circuit is incorporated in the gauge of this invention to prevent the gauge from responding to false signals and to prevent overlapping and confusion of succesive signals. For this purpose, the gas tube 35 is provided with the input electrodes coupled across the bridge diagonal. As shown in the drawing, the grid of gas tube 35 is adjustably connected to the top on the voltage divider 38 across the diagonal and the constants so selected that the tube 35 will fire at any small predetermined variation of the diagonal voltage from zero or from some near-zero value. The anode-cathode circuit of tube 35 includes the secondary winding of transformer 37. This anode-circuit also includes an R. C. time circuit comprising resistor 35a and condenser 35b. Across the condenser 35b is connected the winding of relay 45a which will operate its associated armatures only after condenser 35b is charged to a certain level. When the gas tube 35 is of the commercially available type 2D21 and resistance 35a is about 4700 ohms and condenser 35b is 8 microfarads, the time constant is sufficiently long to permit selection and actuation of the appropriate gas tube 41–43 and the operation of the appropriate pick-up circuit. At the end of this time period, winding 45a opens contact 45 and interrupts any further signals from the stylus to the grids of the gas tubes 41–43. Contacts 45b lock up the relay winding 45a so that contacts 45 are held open until all signal voltage is removed from the grid of tube 55.

Gas tube 40 has a positive grid bias higher than any of the tubes 41–43 and hence fires at a lower applied voltage than any of the other tubes 41–43. Gas tube 40 is employed to trigger certain circuits preparatory to the firing of the other tubes 40–43. Included in the anode of tube 40 is the winding 82 of a relay in the power supply to the circuit of motor 70, as shown. It is contemplated that the motor circuit be closed to the power source 36 until the records make one revolution or one cycle of playing operations, and that the motor circuit be interrupted and the records stopped at the end of the cycle.

Alternatively, of course, the motor could be run continuously and the record-to-speaker circuits selected as above described by gas tube relays 41–43 for each measurement.

Conveniently, cam switches 80 and 81 are mounted on the record player shaft between the records and reduction gearing, not shown, on the motor housing. Cam switch 80 remains open during said one cycle of record playing, whereupon the switch closes to energize relay 83 which, in turn, immediately performs two functions. First, relay 83 opens normally closed contacts 84 to disconnect all cathodes of tubes 40–43 and extinguish the discharge of those tubes. The extinction of the discharge in tube 40 de-energizes relay 82 and opens the motor power circuit. It has been found that the motor, when geared down from, say, 1800 R. P. M. to 45 R. P. M. for the records and cam switches, the coast of the motor is insufficient to re-open the cam switch 80. The second function of relay 83 is to open contacts 85 which de-energizes relay 86 allowing the speaker circuit contacts 86a to drop open. This assures an inactive loud speaker except during actual measuring operations. The lock-up circuit for relay 86 is transferred from contacts 90 to contacts 92 when relay 91 is energized by the first pulse firing tube 40 so that the loud speaker circuit thereafter opens and closes in response to the cam operated switches just described.

The firing of tube 40 and operation of relay 82 also closes the normally open contacts 82a to complete the anode circuit of gas tube 35 with its A. C. source 37 and to permit the commencement of the time measuring cycle of the RC time circuit 35a—35b. Relay 45a is held through its lower contacts 45b even though relay 82 should release.

The specific circuits above described are shown in detail to exemplify one operative embodiment of this invention. Many modifications will occur to those skilled in the art after the disclosure of this specific embodiment without necessarily departing from the scope of the invention defined in the following claims.

The invention claimed is:

1. A measuring device comprising an oscillator, a modulator coupled to the oscillator, a stylus, said modulator being coupled to and responsive to displacement of said stylus from a reference position to modulate the amplitude of the output of the oscillator in accordance with said displacement, means to rectify the modulated oscillator output; a bridge circuit having two adjacent variable impedance branches responsive to applied voltages; a reference voltage source, said reference source and the rectified oscillator output being applied, respectively, to said branches so that one diagonal of the bridge will show a voltage when the applied voltages are unlike; a plurality of grid-controlled gas discharge tubes, means applying progressively different grid-cathode biases to each tube, a circuit connecting all grid-cathodes in parallel across said diagonal; a plurality of distinctive sound recordings and a loud speaker, and a plurality of relays responsive, respectively, to said tubes for selectively coupling one of said recordings to said speaker.

2. An audio gauge comprising a movable stylus, an oscillator with an output circuit, said stylus being mechanically coupled to the output circuit to vary the oscillator output as a function of displacement of the stylus, a source of reference voltage, a comparator for comparing the reference voltage with said output; a plurality of relays, each with a primary and a secondary circuit, means biasing the primary circuits of the relays to progressively different threshold operating voltages, the primary circuits being connected in parallel to the output of said comparator, a loud speaker, a plurality of distinctive phonograph records each with a pick-up, and circuits between the pick-ups and loud speaker responsive, respectively, to said secondary circuits for selectively connecting the pick-ups to the loud speaker.

3. An electrical gauge comprising a movable stylus, means responsive to the stylus for generating a voltage analogous to the displacement of the stylus, a source of reference voltage, means for comparing the two mentioned voltages and for producing a third voltage proportional to the difference thereof, a plurality of grid-controlled gaseous discharge tubes, a circuit for applying in parallel said third voltage to the control circuits of said tubes, a plurality of distinctive indicator circuits, the output circuits of said tubes being coupled, respectively, to said indicator circuits, a relay with a winding and contacts, the contacts being normally closed and in said circuit for applying the third voltage as mentioned; and a time delay circuit responsive to said third voltage for energizing said winding to open said contacts after a predetermined time lapse from the beginning of said third voltage.

4. A measuring gauge comprising an oscillator, a modulator coupled to said oscillator, a rectifier coupled to said modulator, a reference voltage source, a comparator for comparing the reference voltage with the modulated voltage, a plurality of different recordings, a loud speaker, a plurality of relay means responsive to progressively different comparator voltages connected to selectively connect one of said recordings to said loud speaker, a trigger tube responsive to a voltage less than the minimum voltage of said progressive voltages, a motor, a power source for said motor, a relay in the power circuit of the motor responsive to said trigger tube; a time-constant circuit connected to and responsive to said comparator, a relay responsive to said time-constant circuit with normally closed contacts for disconnecting said progressive relays from said comparator, a cam-operated switch driven by said motor, and a relay responsive to said cam-operated switch for interrupting the mentioned relays responsive to progressively different voltages.

5. In a measuring gauge, means for producing voltages analogous to stylus displacement, means for producing a distinctive indication for each of a plurality of ranges of displacement, said means comprising a plurality of grid-controlled gas tubes, a plurality of distinctive indicators, each indicator being selectively responsive to the anode-cathode circuits of said tubes, a time-delay circuit responsive to the minimum of said analogous voltages coupled to the grids of said tubes, and a relay responsive to said indicator means for interrupting the anode-cathode circuits of said tubes.

6. A measuring gauge comprising a stylus, means for producing a variable voltage analogous to displacement from a reference position of said stylus, means for producing a distinctive indication for each of the predetermined steps of stylus displacements, said means comprising a plurality of grid-controlled gaseous discharge devices with means for progressively biasing the grids of said devices to different levels, means for applying said analogous voltages in parallel to said grids, the anodes of said devices being connected each to a relay, means responsive to the last mentioned relays to produce distinctive indications of said steps, a time-delay circuit coupled to the source of analogous voltages for interrupting the grid circuits of said devices, and a relay for interrupting the cathode circuits of said devices in response to completion of any one indication.

7. A measuring gauge comprising means for producing a variable voltage analogous to displacement for a reference position of a measuring stylus, a plurality of progressively differently biased grid-controlled gas discharge tubes, a plurality of distinctive recordings, a common motor driving said recordings, a power source for said motor, a cam-operated switch driven by said motor, circuits responsive to said cam-operated switch for interrupting the anode-cathode circuits of said tubes at the end of a cycle of record playing, and a relay responsive to one of said tubes for interrupting the power to said motor.

8. A measuring gauge comprising means for producing a variable voltage analogous to displacement of a stylus from a reference position, a plurality of grid-controlled gas discharge relays, means for applying said variable voltage to the grids in parallel, a plurality of distinctive signal sources, a motor for actuating said sources, signal producing means, means for selectively coupling the signal producing means to said signal sources coupled, respectively, to the anodes of said tubes, a first relay in the grid circuits of said tubes, a second relay in the cathode circuits of said tubes, the primary circuit of said first relay being coupled through a time-delay circuit to the variable voltage source and the primary circuit of the second relay responsive to said motor.

9. A measuring gauge comprising means for producing a variable voltage analogous to a measurement to be determined, a reference voltage source, means for comparing said two voltages comprising a four-branch bridge with triodes, respectively, in adjacent branches, and fixed resistances in the other two branches, said two voltages being applied, respectively, to the grids of said triodes, a plurality of grid-controlled gas tubes with input-electrodes connected in parallel across one diagonal of said bridge, a time-delay circuit comprising a condenser-resistor network coupled across said diagonal, a relay winding connected across the condenser of said network, the contacts of said relay being in circuit between the gas tubes and bridge for interrupting the gas tube grids after a predetermined time lapse after commencement of a measuring signal, and means for interrupting the cathode-anode circuits of said tubes after the grid circuit interruption.

10. A measuring gauge comprising means for producing a variable voltage analogous to a measurement to be indicated, a reproducer, a plurality of grid-controlled gas tubes responsive to said voltage, a motor with a power circuit for driving a plurality of recorders, relays responsive to said tubes for selectively coupling said recorders to said reproducer, a relay with a primary circuit for controlling said reproducer and a secondary circuit, a switch driven by said motor and coupled to said relay, the primary circuit being responsive to said switch and the secondary circuit being in the anode-cathode circuit of said tubes.

11. A gauge for respectively measuring and grouping a mass of machine parts, comprising means for producing a voltage analogous to the dimensions to be measured; means for dividing said voltage into a plurality of discrete voltage-size groups comprising a plurality of grid-controlled relay tubes, each tube being differently biased to respond to different signals, normally closed contacts in circuit between said means and the grids of said tubes, a winding for operating said contacts, a time-delay circuit coupled between said winding and said means for effecting operation of said contacts to isolate said grids from said source a predetermined time interval after a signal has passed to said grids.

12. A measuring gauge comprising means for generating a voltage analogous in amplitude to a quantity to be measured, an adjustable reference voltage source, means to indicate deviations of said analogous voltage from any predetermined reference voltage including a bridge network containing two variable impedance devices responsive, respectively, to said analogous voltage and to said reference voltage so that a null voltage can be produced at the output terminals of said bridge for any reference quantity to be measured and means coupled to said bridge output for generating a plurality of voltages of different distinct values for each of a plurality of adjacent ranges of variation of bridge output voltage.

13. A measuring gauge comprising a movable stylus for generating voltages of different values analogous to different positions of said stylus, a plurality of recorders bearing sound recordings indicative of said different positions, a loudspeaker, relay operated switch means for coupling any one of said recorders to said speaker, and means coupled to said voltage generating means and said switch means responsive to each of said different voltages for selectively operating said switch means to couple a recorder to said loudspeaker representative only of the stylus position.

References Cited in the file of this patent
UNITED STATES PATENTS

| | | |
|---|---|---|
| 2,362,918 | Miller | Nov. 14, 1944 |
| 2,417,292 | Coake | Mar. 11, 1947 |
| 2,503,851 | Snow | Apr. 11, 1950 |
| 2,558,683 | Hart | June 26, 1951 |
| 2,584,714 | Kirkpatrick | Feb. 5, 1952 |
| 2,659,182 | Argyle | Nov. 17, 1953 |